(12) United States Patent
Fabian et al.

(10) Patent No.: US 6,866,478 B2
(45) Date of Patent: Mar. 15, 2005

(54) MINIATURE GAS TURBINE ENGINE WITH UNITARY ROTOR SHAFT FOR POWER GENERATION

(75) Inventors: Tibor Fabian, Menlo Park, CA (US); Frank Holman, Paradise Valley, AZ (US); Sangkyun Kang, Palo Alto, CA (US); Hao-Chih Liu, Redwood City, CA (US); Minoru Matsunaga, Tokyo (JP); Fritz B. Prinz, Menlo Park, CA (US); Hideaki Tsuru, Mountain View, CA (US)

(73) Assignees: The Board of Trustees of the Leland Stanford Junior University, Stanford, CA (US); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/431,345

(22) Filed: May 6, 2003

(65) Prior Publication Data

US 2004/0016239 A1 Jan. 29, 2004

Related U.S. Application Data

(60) Provisional application No. 60/378,112, filed on May 14, 2002.

(51) Int. Cl.$^7$ ............................................. F01D 5/04
(52) U.S. Cl. ............................ 415/198.1; 415/216.1; 415/915
(58) Field of Search .................... 415/216.1, 217.1, 415/224, 198.1, 915; 416/175, 200 A, 198 R

(56) References Cited

U.S. PATENT DOCUMENTS

| | | | |
|---|---|---|---|
| 4,011,737 A | 3/1977 | Kruger et al. | ............. 64/9 A |
| 4,063,850 A | 12/1977 | Hueber et al. | ............. 415/214 |
| 4,225,346 A | 9/1980 | Helliker et al. | ............. 75/211 |
| 4,476,150 A | 10/1984 | Rose | ............. 427/10 |
| 4,702,782 A | 10/1987 | Chin | ............. 148/429 |

(List continued on next page.)

FOREIGN PATENT DOCUMENTS

JP  2001012256 A  * 1/2001  ........... F02C/3/045

OTHER PUBLICATIONS

M. Mehregany et al., "Micro gears and turbines etched from silicon," Sensors and Ac tuators, 12 (1987) 341–348.

(List continued on next page.)

*Primary Examiner*—Edward K. Look
*Assistant Examiner*—Richard A. Edgar
(74) *Attorney, Agent, or Firm*—Lumen Intellectual Property Services, Inc.

(57) ABSTRACT

The present invention provides a miniature gas turbine engine for power generation. The engine has a highly integrated unitary rotor shaft where turbine, compressor and shaft are made in one piece in one fabrication process. The turbine and compressor are positioned back to back on the shaft in an overhung configuration, allowing the front bearings to be located in the cold zone of the engine. Preferably, the Mold SDM fabrication technique is utilized to make the unitary rotor shaft in one monolithic part out of ceramics such as silicon nitride, eliminating the need for post process assembly while strengthening the integrity, reliability, and performance of the unitary rotor shaft. Integrated with a permanent magnet in the unitary rotor shaft, the miniature gas turbine engine can generate electric power of 1 kW or less. Additionally, the axial length of the miniature gas turbine engine is about 100 mm or less. The miniature gas turbine engine according to the present invention is therefore particularly useful for powering lightweight, self-sustaining mobile devices such as unmanned vehicles and-autonomous robots.

20 Claims, 3 Drawing Sheets

U.S. PATENT DOCUMENTS

| | | | |
|---|---|---|---|
| 4,854,025 A | 8/1989 | Oda et al. | 29/156.8 |
| 4,866,829 A | 9/1989 | Oda | 29/156.8 R |
| 4,878,812 A | 11/1989 | Kito et al. | 416/241 |
| 5,102,305 A | 4/1992 | Bescoby et al. | 417/407 |
| 5,104,747 A | 4/1992 | Makino et al. | 428/621 |
| 5,120,395 A | 6/1992 | Monson et al. | 156/653 |
| 5,133,122 A | 7/1992 | Kawasaki et al. | 29/889.2 |
| 5,169,297 A | 12/1992 | Mizuno et al. | 417/407 |
| 5,207,054 A | 5/1993 | Rodgers et al. | 60/39.39 |
| 5,932,940 A | 8/1999 | Epstein et al. | 310/40 |
| 6,161,768 A | 12/2000 | Gordon et al. | 237/12.1 |
| 6,392,313 B1 | 5/2002 | Epstein et al. | 290/52 |

OTHER PUBLICATIONS

S. A. Jacobson et al., "The fluid dynamics for a microfabricated gas turbine engine," the DGD95 Meeting of the American Physical Society, date submitted Aug. 9, 1996.

A. H. Epstein et al., "Power mens and microengines," to be presented at the IEEE Transducers 1997 Conference, Chicago, IL, Jun. 1997.

Steven Ashley, "Turbines on a dime," retrieved on Apr. 8, 2003. Retrieved from the internet: <URL: http://www.memagazine.org/backissues/october 97/features/turbdime/turbdime.html>.

David A. Laguna–Aponte, "Mems: more powerful and efficient, smarter, cleaner and cheaper to manufacture," Apr. 3, 1999, retrieved from the internet:URL:http://www.mit.edu/afs/athena/course/other/sp.746/www/articles/drafts/dalarticle2.

Frank Bokulich, "Mini turbine engine laboratory," Aerospace engineering online: technology update: Aug. 2000, p. 8.

Amit Mehra et al., "A six–wafer combustion system for a silicon micro gas turbine engine," Journal of Microelectromechanical Systems, vol. 9, No.4 Dec. 2000.

"Engines turned tiny," Posted on May 30, 2001, retrieved on Apr. 8, 2003. Retrieved from the internet: <URL:http://www.ammagazine.com/CDA/articleinformation/features/BNP_features_Item/0,2606,27001,00.html>.

Louise Knapp, Wired new:the little engine that could be, retrieved on Apr. 8, 2003. Retrieved from the internet: <URL: http://www.wired.com/news/technology/0,1282,48400,00.html>.

C. M. Spadaccini et al., "High power density silicon combustion systems for micro gas turbine engines," Proceedings of ASME Turbo Expo 2002. Amsterdam, the Netherlands, Jun. 2002.

"Micro gas turbine, development status, micro gasturbine generation," retrieved on Apr. 8, 2003. Retrieved from the internet: <URL: http://www.neuros.co.kf/_eng/04gov/gov_03.htm>.

Profs. Ilan Kroo et al., "The mesicopter: a meso–scale flight vehicle NIAX phase II technical proposal," retrieved on Apr. 8 2003. Retrieved from the internet: <URL: http://www.arl.psu.edu/punlications/silverbook/pdfs/silverbook.pdf.>.

S. M. Spearing et al., "Micro–gaas turbine engine materials and structures," presented at the 21th annual cocoa beach conference and exposition on composites, advanced ceramics, materials and structures, Jan. 1997.

"Micro–turbines," retrieved on Apr. 8, 2003. Retrieved from the internet: <URL: http://www.m–dot.com/page8..html >.

Alan H. Epstein et al., "Shirtbutton–sized gas turbines: The engineering challenges of micro high speed rotating machinery," proceedings of the $8^{th}$ Int'l Symposium on Transport Phenomena and Dynamics of Rotating Machinery (ISROMAC'8), Honolulu, Hawaii, Jan. 2000.

* cited by examiner

MINIATURE GAS TURBINE ENGINE WITH UNITARY ROTOR SHAFT FOR POWER GENERATION

CROSS-REFERENCE TO RELATED APPLICATIONS

This application claims the benefit of a provisional patent application No. 60/378,112, filed May 14, 2002, the content of which is hereby incorporated by reference.

BACKGROUND OF THE INVENTION

1. Field of the Invention

The present invention relates generally to miniaturized turbomachines, and, more particularly, to a miniature gas turbine engine for power generation with a unitary rotor shaft where turbine, compressor, rotor shaft, and power generator are integrated in one piece.

2. Description of the Related Art

The fundamental components of a gas turbine engine for power generation include a combustor, a turbine, a compressor, a rotor shaft, and an alternator, which is on the extension of the rotor shaft and which converts mechanical energy into usable electric power. The turbine and compressor reside in a high temperature (hot) zone of the engine while the rotor shaft, carrying the turbine and compressor, extends from the hot zone to a low temperature (cold) zone. In known gas turbine engines, the turbine, compressor, and rotor shaft are usually joined or assembled and not fabricated as one piece. Furthermore, the rotor shaft may be made of two different materials such as steel and ceramic.

In U.S. Pat. No. 4,063,850, titled "GAS TURBINE ENGINE HAVING A CERAMIC TURBINE WHEEL," issued to Hueber et al., and assigned to Motoren- und Turbinen-Union Munchen GmbH, Munich, Germany, hereinafter referred to as Hueber, a rotor shaft comprising a metal portion and a ceramic portion is disclosed. In Hueber, a turbine wheel is made from a ceramic material and is formed integrally as one piece with the ceramic portion of the rotor shaft. The place of connection, which may be made by brazing, interlocking, or fusing, of the metal portion to the ceramic portion of the shaft is located in a cooler zone of the engine. Precision shaft assembly is required to manufacture the gas turbine engine disclosed by Hueber.

In U.S. Pat. No. 5,102,305, titled "TURBOMACHINE HAVING A UNITARY CERAMIC ROTATING ASSEMBLY," issued to Bescoby et al., and assigned to Allied-Signal Inc., N.J., U.S.A., hereinafter referred to as Bescoby, a unitary ceramic rotating assembly mounted within a split housing is disclosed. In Bescoby, the unitary rotating assembly includes a ceramic shaft, fins, a bearing runner, as well as a turbine and a compressor symmetrically attached to opposite ends of the ceramic shaft, all of which are mounted within the split housing. The unitary rotating assembly of Bescoby is a complex design where the rotor shaft must be mounted within the split housing and supported by a hydrodynamic film of fluid. Furthermore, Bescoby does not address whether the unitary rotating assembly is suitable for generating power in miniature applications.

As illustrated in Hueber and Bescoby, conventional compressor and turbine for a gas turbine engine have three-dimensionally complicated geometry based on turbo machinery design. Due to design and shape complexities, individual components are manufactured separately and assembled by using a various kind of joining techniques. For miniature applications, such conventional assembly process becomes more challenging as the size of the components is scaled down.

The need for a portable miniature power source is increasing with the development of unmanned aerial vehicles, autonomous robots and other scaled-down mobile, sensory, surveillance devices. As one skilled in the art would appreciate, since the physics and mechanics influencing the design of the components of a miniature device do change with scale, some scaling effects in designing miniature devices can be extremely difficult to overcome, for example, the viscous forces in the fluid, surface area to volume ratios, chemical reaction times, the electric field strength, and manufacturing constraints, which are limited mainly to two-dimensional planar geometries. Other design and aerodynamic issues related to the compressor and turbine of miniature turbomachines include low Reynolds number, surface roughness, tip clearances, and minimum feature size, all of which can lead to reduced levels of performance.

SUMMARY OF THE INVENTION

Accordingly, it is a primary goal of the present invention to provide a new, useful, and reliable miniature gas turbine engine for power generation. This goal is achieved with a high quality and high performance unitary rotor shaft that combines and integrates turbine, compressor, and shaft in one piece. Preferably, the Mold SDM fabrication technique is utilized to make the unitary rotor shaft in one monolithic, three-dimensional part out of ceramics such as silicon nitride, an extremely strong material. The turbine and compressor are positioned back to back on the shaft in an overhung configuration, allowing the front bearings to be located in the cold zone of the engine.

Integrated with a permanent magnet in the unitary rotor shaft, the miniature gas turbine engine can generate electric power of 1 kW or less, e.g., 100 W. The axial length of the miniature gas turbine engine is about 100 mm or less. The unitary nature of the highly integrated rotor shaft effectively eliminates the costly post process assembly. The inventive design also enhances the integrity and reliability of the rotor shaft. The components of the miniature gas turbine engine according to the present invention are extremely small compared to a conventional gas turbine engine, e.g., in some embodiments, the diameter of the turbine and compressor configuration is about 20 mm or less. Because of its small size and lightweight, the miniature gas turbine engine can be used as a portable energy source and is particularly suitable for a power supply device in mobile applications, for example, portable devices, unmanned vehicles, and autonomous robots.

DETAILED DESCRIPTION OF THE INVENTION

This invention presents a new and inventive miniature gas turbine engine for power generation with a unitary rotor shaft where turbine, compressor and shaft are made in one piece. Utilizing novel fabrication techniques for very small, intricate, and three-dimensionally complicated components, this inventive design advantageously eliminates the post process shaft assembly, enables the manufacturing of a high-quality and high-performance unitary rotor shaft, thereby provides a viable and reliable miniature gas turbine engine for power generation. The size of miniature gas turbine engine is about 100 mm or less in axial length and it generates electric power of about 1 kW or less, e.g., about 100 W. Because of its small size and lightweight, the miniature gas turbine engine is particularly suitable for a power supply device in mobile applications.

There is an ongoing effort in the art to develop micro scale, lightweight power generator for portable power sources, autonomous robots, and miniature factories, etc. These applications require both large energy density and large power density at up to 1 kW power range. As discussed herein, due to the scaling effects, it is extremely difficult to design and produce a reliable and viable miniature power source. Amongst combustion type power generators, gas turbine engines are ideal candidates for miniaturization due to their simple, non-reciprocating mechanisms and continuous combustion.

The fundamental design of a gas turbine engine includes a compressor, a rotor shaft, a turbine, a combustor and an alternator, which is on the extension of the rotor shaft and converts mechanical energy into usable electric power. The components for the miniature gas turbine disclosed herein are extremely small compared to a conventional gas turbine engine. In some embodiments, a diameter of the compressor/turbine wheels is less than 20 mm and the blade thickness is less than 500 $\mu$m. For a self-sustaining operation, the unitary rotor shaft according to the present invention can spin at more than 500,000 rpm.

Figure 1:
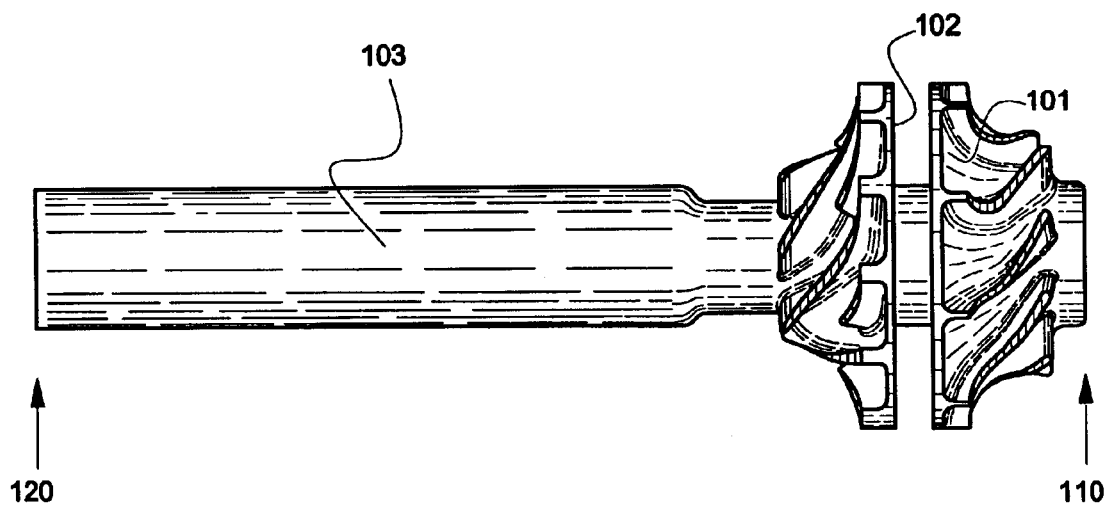
FIG. 1 is a side view of a unitary rotor shaft according to the present invention.

FIG. 1 illustrates a side view of a fully integrated unitary rotor shaft 100 characterized as having a turbine portion 101 and a compressor portion 102 asymmetrically positioned at a first end 110 of the rotor shaft 100, with a shaft portion 103 axially extending from the first end 110 to a second end 120 of the rotor shaft 100. As disclosed herein, in some embodiments, the first end 110 is in the hot zone of a miniature gas turbine engine and the is second end 120 is in the cold zone of the engine. The distance between the first and second ends can be smaller than 100 mm.

Figure 2:
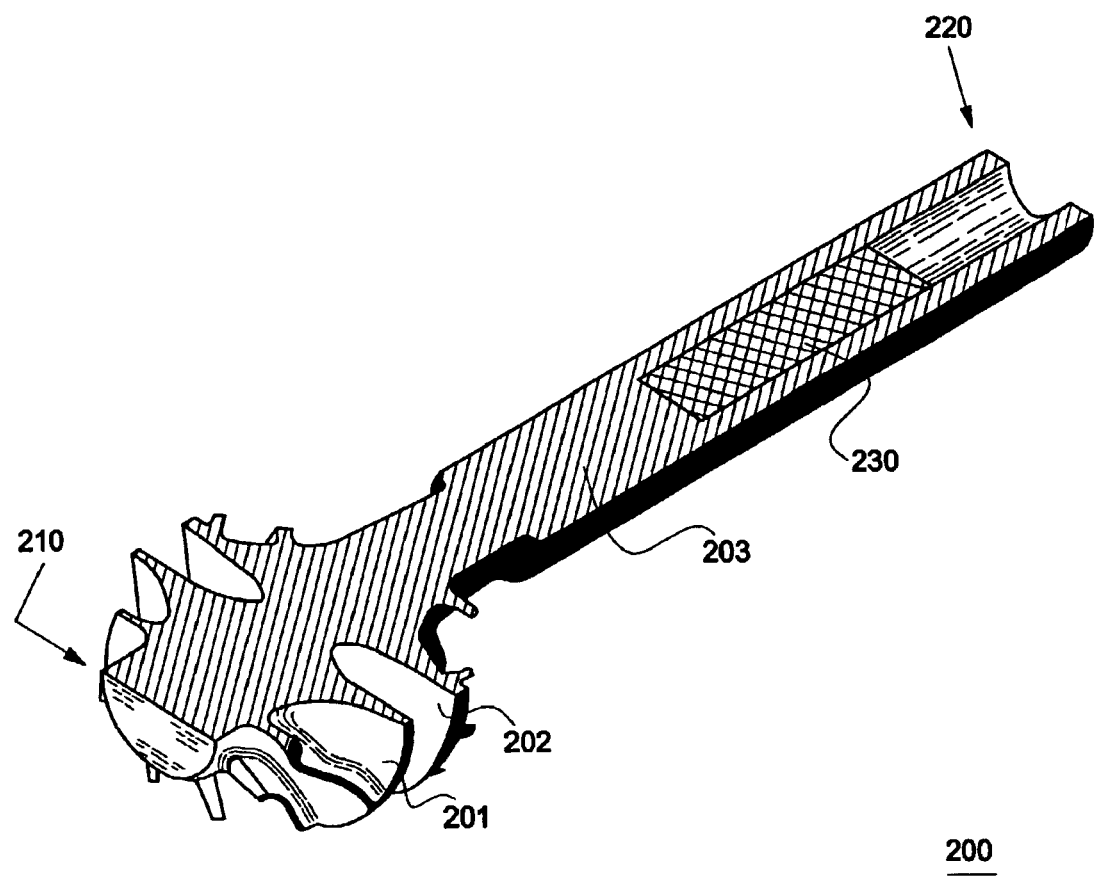
FIG. 2 is a cross sectional view of a unitary rotor shaft integrated with a permanent magnet for power generation according to an aspect of the invention.

According to an aspect of the invention, the unitary rotor shaft is integrated with a power generator. In some embodiments, the unitary rotor shaft is integrated with a permanent magnet in the shaft portion for power generation. FIG. 2 shows a cross sectional view of an exemplary unitary rotor shaft 200 integrated with a permanent magnet 230. The unitary rotor shaft 200 has a turbine portion 201 and a compressor portion 202 asymmetrically positioned back-to-back at a first end 210 of the rotor shaft 200, with a shaft portion 203 axially extending from the first end 210 to a second end 220 of the rotor shaft 200. In this embodiment, the permanent magnet 230 is integrated towards the second end 220 away from the compressor 202.

The permanent magnet 230 can be embedded or otherwise made as part of the unitary rotor shaft 200 during the manufacturing process thereof, or it can be attached to the shaft using a variety of techniques such as shrink fitting, adhesives, blazing, and diffusion bonding.

Figure 3:
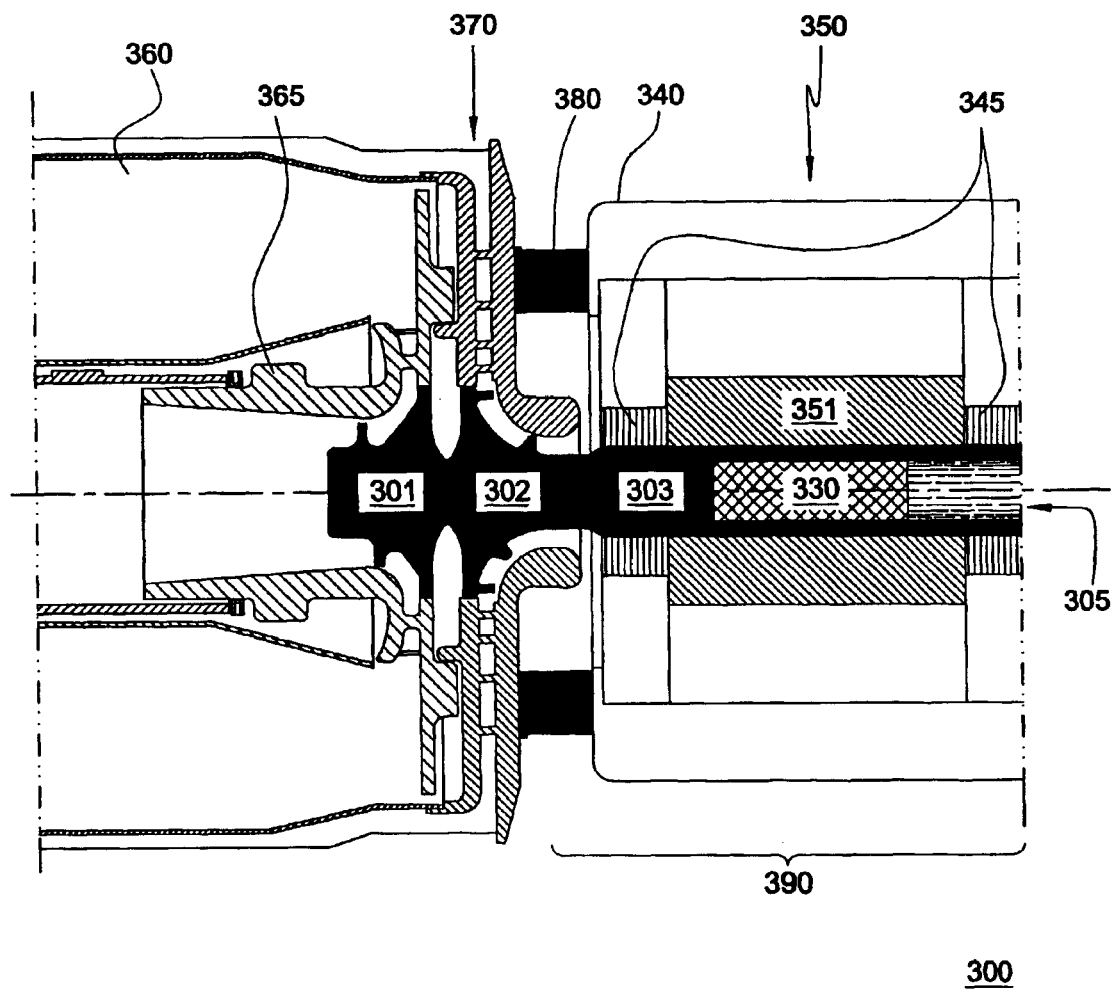
FIG. 3 is a cross sectional view of a miniature gas turbine engine having a unitary rotor shaft integrated with a permanent magnet for power generation according to an aspect of the invention.

FIG. 3 illustrates a miniature gas turbine engine 300 comprising a combustion chamber 360, inlet nozzle 365, diffuser 370, and a unitary rotor shaft 305 integrated with a permanent magnet 330 for power generation. Structural support is additionally provided by connectors 380. The unitary rotor shaft 305 has a turbine portion 301 and a compressor portion 302 positioned back-to-back in an overhung configuration. A shaft portion 303 axially extends from the compressor portion 302. In this embodiment, the permanent magnet 330 is integrated in the shaft portion 303 away from the compressor 302 and is housed in a housing 340 together with stator assembly 350, which includes a stator and coil 351. Components of gas turbine engines are well understood by one skilled in the art and thus are not further described herein.

The unitary rotor shaft 305 is supported by journal/thrust bearings 345 located in the cold zone 390. Thermally severe operating conditions are a common problem in conventional rotor shaft configurations where the rear bearing is exposed to high temperature due to its location between or otherwise in close proximity to the compressor and the turbine. By allowing the bearings 345 to be located at the front end away from the compressor, i.e., in the cold zone 390 where the temperature is in a moderate range, the miniature gas turbine engine 300 according to the present invention has the advantage of preventing the bearings from thermally severe operating conditions.

On the other hand, the unitary rotor shaft must withstand high temperature, high pressure, high speeds, and internal vibration of the miniature gas turbine engine. Accordingly, fabrication processes utilized to produce the unitary rotor shaft should be capable of producing high quality unitary rotor shafts, i.e., small, complex, intricate, three-dimensional parts with integrated macro and micro features, that meet shape accuracy, surface quality, material integrity, and alignment requirements. Exemplary fabrication processes include layer manufacturing (LM) processes such as the mold shape deposition manufacturing (Mold SDM) process and the laser engineered net shape (LENS) process.

In a preferred embodiment, the unitary rotor shaft is fabricated utilizing the Mold SDM process. The Mold SDM is a two-step process that can be used to build simple as well as complex, three-dimensional ceramic, metal and polymer parts. Fugitive molds are first built using an additive-subtractive layered manufacturing process. The molds can be made of any kinds of fugitive material, e.g., wax. A variety of castable materials, including ceramic and metal gelcasting slurries as well as castable thermoset polymers, can be cast into these molds to produce parts. The Mold SDM process advantageously provides both shape complexity and superior surface finish compared to the other rapid prototyping processes such as 3-D printing, stereolithography (SLA), selective laser sintering (SLS) and fused deposition manufacturing (FDM). For detailed teachings on Mold SDM, readers are referred to A. G. Cooper, S. Kang, J. W. Kietzman, F. B. Prinz, J. L. Lombardi, and L. Weiss, "Automated Fabrication of Complex Molded Parts Using Mold Shape Deposition Manufacturing" Materials and Design, 20 (⅔):83–89, 1999.

The unitary rotor shaft is characterized as a monolithic structure that can be made entirely of heat-resistant metals, e.g., a hard alloy containing principal constituents of nickel, chromium, and cobalt, with lesser amounts of aluminum, titanium, tungsten, molybdenum, tantalum, cadmium, copper and/or zinc in varying proportions. An exemplary alloy is a complex super alloy known as Inconel®.

Preferably, the unitary rotor shaft is made entirely of a single ceramic material, such as silicon nitride ($Si_3N_4$), or a ceramic composite, such as silicon nitride ($Si_3N_4$) strengthened with silicon carbide (SiC) whiskers. Among the ceramic materials, silicon nitride can have exceptional high temperature properties as well as low density (s.g.=3.3, approximately). These properties make silicon nitride a very attractive material for the components of mobile power sources. However, application of silicon nitride is hindered by two major issues: reliability and difficulties in shaping parts, especially where joining parts is required. Furthermore, since the strength of ceramic parts is highly sensitive to the surface smoothness due to the brittleness of ceramics, superior surface finish is particularly important in the fabrication of ceramic components. An aspect of the present invention provides a method of making a unitary rotor shaft with the Mold SDM process. The unitary nature of the inventive rotor shaft design advantageously eliminates issues related to joining parts while the Mold SDM process provides superior surface finish as described herein.

Compared with conventional methods in which a compressor wheel and a turbine wheel are individually fabricated out of heat resistant metals or ceramics and then assembled by joining techniques such as interlocking, blazing and shrink fitting, the highly integrated unitary rotor shaft according to the present invention has the following advantages:
1. Strength of rotor shaft essentially equals material strength—no critical bottleneck with lower strength.
2. Shaft straightness is relatively easily achieved and maintained.
3. Utilizing a novel manufacturing technique, which allows unitary rotor shaft fabrication with intricate three-dimensional features of less than 500 $\mu$m, the difficult, costly, and time-consuming post process assembly can be eliminated or substantially minimized. Investment casting using SLA model, Shape Deposition Manufacturing (SDM), and Mold SDM are good candidates for the process.
4. The problem caused by coefficient thermal expansion (CTE) difference within a rotor shaft, between and around the hot and cold zones, is eliminated.

In embodiments where the highly integrated unitary rotor shaft is made of a ceramic material, the present invention provides the following advantages:
5. Low density of the ceramic material helps to lower the weight of the overall device, the inertia of the rotor, and the required supporting force of bearings.
6. Stress resulting from centrifugal force is dramatically reduced.
7. Due to low CTE of the ceramic material, heat expansion of the unitary rotor shaft is reduced, which minimizes problems that may occur during assembly with other components of the miniature gas turbine engine such as the diffuser, shroud, and inlet nozzle, which may be made of metals.
8. The inventive rotor configuration such as the location of critical components, i.e., the compressor, turbine, and bearings, affords less attention to zone temperature and therefore provides design flexibility otherwise unavailable.
9. Due to low heat conductivity, total amount of heat flux translating from the hot zone to the cold zone is reduced.

Another advantage of the miniature gas turbine engine according to the present invention is the increased power density. The power density can be measured by power/volume and/or power/weight. The latter is occasionally more attractive in some mobile applications. Moreover, since the same output power can be achieved in a smaller volume using multiple small (micro) engines, a redundant system can be implemented instead of one big engine. Such design, i.e., the redundant system with multiple micro engines, further enhances reliability in mobile applications.

Although the present invention and its advantages have been described in detail, it should be understood that the present invention is not limited to or defined by what is shown or discussed herein. For example, the present invention is not limited by types of engine gas flow, axial or radial. As such, the drawings and description disclosed herein are for purposes of illustrating a preferred embodiment(s) of the present invention and are not to be construed as limiting the present invention. Known methods, systems, or components may be discussed without giving details, so to avoid obscuring the principles of the invention.

As it will be appreciated by one of ordinary skill in the art, various changes, substitutions, and alternations could be made or otherwise implemented without departing from the principles of the present invention. Accordingly, the scope of the invention should be determined by the following claims and their legal equivalents.

We claim:

1. A miniature gas turbine engine having an axial length of about 100 mm or less, the miniature gas turbine engine comprising:
   a highly integrated unitary rotor shaft having a turbine portion and a compressor portion asymmetrically positioned at a first end of the unitary rotor shaft and a shaft portion axially extending from the first end to a second end of the unitary rotor shaft; wherein
   the turbine portion, the compressor portion, and the unitary rotor shaft are integrated as one monolithic piece.

2. The miniature gas turbine engine according to claim 1, in which the first end is in a hot zone of the miniature gas turbine engine and the second end is in a cold zone of the miniature gas turbine engine.

3. The miniature gas turbine engine according to claim 2, further comprising:
   journal/thrust bearings positioned in the cold zone for supporting the unitary rotor shaft.

4. The miniature gas turbine engine according to claim 1, in which diameter of the turbine portion and the compressor portion is about 20 mm or less.

5. The miniature gas turbine engine according to claim 1, in which blade thickness of the turbine portion and the compressor portion is about 500 $\mu$m or less.

6. The miniature gas turbine engine according to claim 1, in which operation speed of the unitary rotor shaft is about 500,000 rpm or more.

7. The miniature gas turbine engine according to claim 1, in which a distance between the first end and the second end is less than 100 mm.

8. The miniature gas turbine engine according to claim 1, further comprising: magnetic means integrated in the shaft portion for generating power of about 1 kW or less.

9. The miniature gas turbine engine according to claim 8, in which the magnetic means is a permanent magnet embedded in the shaft portion and made as part of the unitary rotor shaft.

10. The miniature gas turbine engine according to claim 8, in which the magnetic means is a permanent magnet attached to the unitary rotor shaft.

11. The miniature gas turbine engine according to claim 8, in which the magnetic means is integrated in the unitary rotor shaft by shrink fitting, adhesives, blazing, or bonding.

12. The miniature gas turbine engine according to claim 1, in which the unitary rotor shaft is made of a hard alloy containing principal constituents of nickel, chromium, and cobalt, with lesser amounts of aluminum, titanium, tungsten, molybdenum, tantalum, cadmium, copper, and zinc in varying proportions.

13. The miniature gas turbine engine according to claim 1, in which the unitary rotor shaft is made of a heat-resistant material selected from the group consisting of a complex super alloy, a monolithic ceramic material, a ceramic composite, silicon nitride, and silicon nitride strengthened with silicon carbide whiskers.

14. The miniature gas turbine engine according to claim 1, in which the unitary rotor shaft is made with a fabrication process selected from the group consisting of layer manufacturing, shape deposition manufacturing, mold shape deposition manufacturing, stereolithography, and laser engineered net shape.

15. A method of making a miniature gas turbine engine for power generation, the miniature gas turbine engine capable of operating at about 500,000 rpm or more, the method comprising:

utilizing a fabrication process selected from the group consisting of layer manufacturing, shape deposition manufacturing, mold shape deposition manufacturing, stereolithography, and laser engineered net shape to construct a highly integrated unitary rotor shaft having a turbine portion and a compressor portion asymmetrically positioned at a first end of the unitary rotor shaft and a shaft portion axially extending from the first end to a second end of the unitary rotor shaft, in which diameter of the turbine portion and the compressor portion is about 20 mm or less, blade thickness of the turbine portion and the compressor portion is about 500 μm or less, and a distance between the first end and the second end is less than 100 mm.

16. The method of claim 15, further comprising:
integrating a magnetic means in the shaft portion.

17. The method of claim 15, further comprising:
attaching a permanent magnet to the unitary rotor shaft after the fabrication process.

18. The method of claim 15, further comprising:
embedding a permanent magnet to the unitary rotor shaft by shrink fitting, adhesives, blazing, or bonding.

19. The method of claim 15, in which the unitary rotor shaft is made of a hard alloy containing principal constituents of nickel, chromium, and cobalt, with lesser amounts of aluminum, titanium, tungsten, molybdenum, tantalum, cadmium, copper, and zinc in varying proportions.

20. The method of claim 15, in which the unitary rotor shaft is made of a heat-resistant material selected from the group consisting of a complex super alloy, a monolithic ceramic material, a ceramic composite, silicon nitride, and silicon nitride strengthened with silicon carbide whiskers.

\* \* \* \* \*